Dec. 26, 1967   J. ZEMANEK, JR   3,359,787
METHOD AND APPARATUS FOR MONITORING LIQUIDS
Filed Dec. 24, 1964
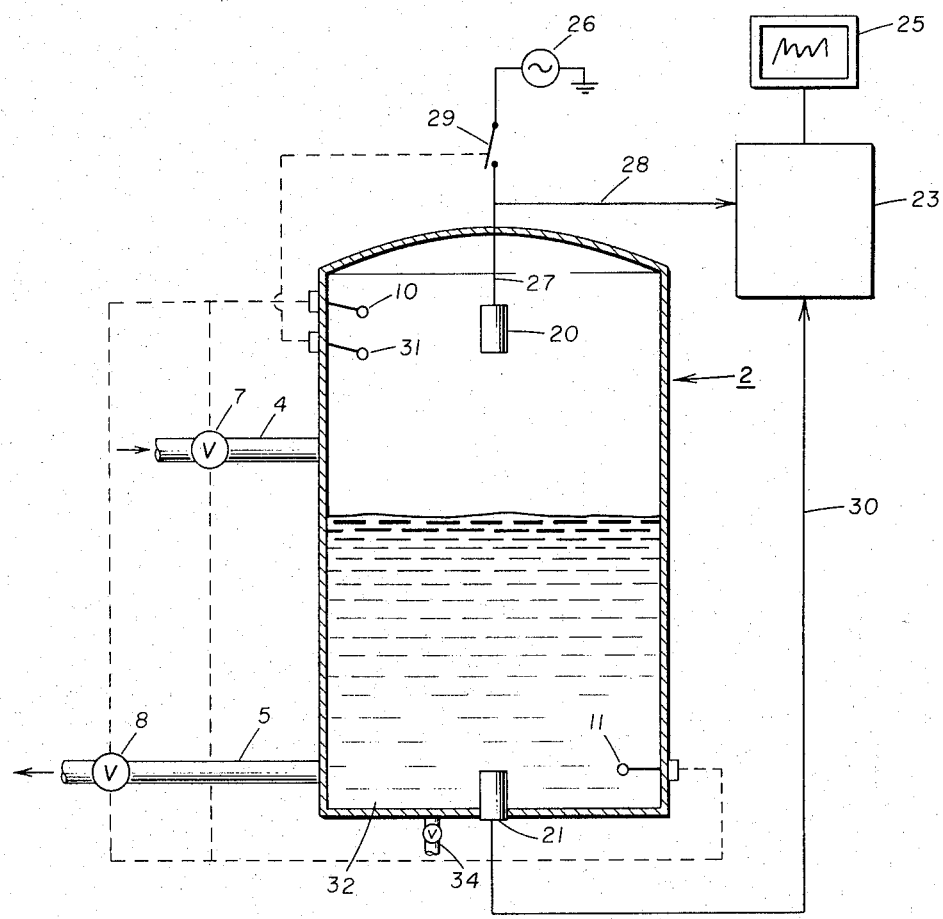
JOSEPH ZEMANEK, JR.
INVENTOR.
BY *William D. Jackson*
ATTORNEY

United States Patent Office 3,359,787
Patented Dec. 26, 1967

3,359,787
METHOD AND APPARATUS FOR MONITORING LIQUIDS
Joseph Zemanek, Jr., Dallas, Tex., assignor to Mobil Oil Corporation, a corporation of New York
Filed Dec. 24, 1964, Ser. No. 421,027
13 Claims. (Cl. 73—61.1)

ABSTRACT OF THE DISCLOSURE

A method and apparatus for characterizing a liquid by passing a radiation wave signal between vertically spaced elevations in a vertical accumulation of liquid within a chamber. The apparatus includes a dump-type meter provided with vertically spaced acoustic transducers and means for measuring the travel-time between the transmitting and receiving transducers as an indication of the amount of water in oil.

---

This invention relates to a method and apparatus for characterizing a liquid and more particularly to a method and apparatus for measuring the amount of water in oils such as petroleum crude oils.

It often is necessary to determine the amount of a contaminant material in a liquid stream. For example, in the petroleum industry, crude oil that is delivered through a conduit to a pipeline or other purchaser normally is monitored with regard to its water content. This is accomplished by means of BS & W (basic sediment and water) monitors which measure the amount of water in the crude oil and record these measurements and/or respond to a water content of a predetermined level to divert the oil stream to a bad oil tank or directly to a treating system.

The BS & W monitors in most common use today are of the capacitance-probe type which detects the presence of water by means of the change in the dielectric constant of an oil stream flowing through a conduit. Since the dielectric constants of most petroleum oils are in the nature of about 40 times as great as the dielectric constant of water, relatively small amounts of water may be detected by this type of monitor. While the capacitance-probe monitor may be extremely accurate, it often is adversely affected by certain commonly existing conditions. For example, the monitor must measure a homogeneous mixture in order to achieve a permissible degree of accuracy. Laminar flow in which the oil and liquid tend to separate into different phases is not conducive to efficient monitor operation. Also, "slug type" flow in which successive slugs of water and oil flow through the line adversely affects the monitor.

Because of the disadvantages inherent in the capacitance-probe monitor, other types have been proposed. For example, it has been suggested to characterize a petroleum oil with regard to its water content by means of acoustic monitoring systems in which the velocity or attenuation of an acoustic signal in the fluid stream is used to ascertain the amount of water in the oil. In addition to the mechanical wave radiation employed by sonic monitored systems, it also has been proposed to utilize electromagnetic radiation in order to characterize an oil stream with regard to its water content. A typical system of this type includes a gamma ray source and a detector. The extent to which the gamma radiation is attenuated by the oil stream flowing between the source and detector is indicative of the amount of water therein.

These mechanical or electromagnetic radiation type monitors have so far failed to function as effectively as might be desired because their accuracy is affected by gas in the conduit carrying the oil stream. Since at any given point in the conduit the cross-sectional areas of gas and liquid may vary widely, it is difficult to compensate for the presence of gas.

In accordance with the instant invention, there are provided a method and apparatus which overcome the aforementioned disadvantages of radiation type monitors. In carrying out the invention, a liquid such as oil flowing through a conduit is passed into a chamber to form a vertical column of the liquid. A radiation signal is generated in the liquid column at a point adjacent one end thereof. The signal is detected at a second point in the liquid column adjacent the other end thereof and at a known distance from the generation point. A characteristic of the radiation signal then is measured in order to determine the quantity of contaminant in the liquid.

In one embodiment of the invention, a conventional dump tank is provided with an acoustic monitoring system. The dump tank includes means for alternately filling the tank with an oil to a predetermined upper level and thereafter draining the tank to a predetermined lower level. As is well understood in the art, the tank is alternately filled and emptied in order to measure the quantity of oil. The acoustic monitoring system includes a transmitter positioned in one of an upper elevation and a lower elevation in the tank and an acoustic receiver disposed in the other of these elevations. The transmitter and receiver thus are vertically spaced such that they span a substantial column of the oil when it reaches a specified upper level in the tank. Level sensing means is provided for energizing the transmitter when the liquid in the tank reaches a specified level. At least one acoustic pulse thus is generated which is detected by the receiver. Means operatively connected with the transmitter and the receiver measure a characteristic of the acoustic pulse which is indicative of the amount of water in the oil.

In a preferred embodiment of the invention, the characteristic measured is the time required for the pulse to travel from the transmitter to the receiver. The velocity of an acoustic pulse in an oil varies with the amount of water therein. For example, tests on various crude oils have shown the velocity of sound in these oils to be in the range of about 4500–4700 feet per second. The velocity of sound in formation waters associated with these oils is in the range of about 5000–5200 feet per second, and for crude oils containing water the velocity varies between the above values in a substantially linear relationship with the amount of water in the oil. This relationship holds true regardless of whether the water and oil are in a relatively homogeneous mixture as in the case of water and oil emulsion or are stratified due to the tendency of the water to settle out of the oil. Thus, the invention provides a reliable system for monitoring a crude oil for its water content.

For a more detailed description of the invention, reference may be had to the drawing which is an elevation partly in section illustrating one embodiment of the invention.

With reference to the drawing, there is shown an automatic monitoring device embodying the present invention. A dump tank is connected in a conduit extending from a suitable source of crude oil such as a gas-oil separator to a terminal point such as a pipeline. The dump tank is filled automatically with a known quantity of crude oil and then drained in order to measure the amount of oil delivered to the pipeline. The tank is provided with an acoustic monitoring system which automatically generates an acoustic pulse through a column of the oil of known height and measures the travel time of the pulse.

More particularly, and with reference to the drawing, there is shown a dump tank 2 having inlet and outlet lines 4 and 5, respectively. The flow of liquid into and out of the tank is controlled by inlet and outlet valves 7 and 8, respectively, which are power-operated valves of any conventional type. As will be recognized by those skilled in the art, valves 7 and 8 may be electrically, pneumatically, hydraulically or mechanically operated.

Tank 2 is provided with upper and lower level sensing control means of any suitable type known in the art. In the embodiment shown, the control means take the form of conventional upper and lower float switches 10 and 11, respectively. Each of float switches 10 and 11 is operatively connected as indicated by the dash lines to valves 7 and 8 in order to control the operation of these valves and provide for the automatic filling and draining of the tank 2.

As illustrated in the drawing, the dump tank is shown in a filling cycle in which valve 8 is closed and valve 7 is open to allow liquid to enter the tank. Valve 7 will remain open until the liquid reaches a predetermined upper level where it actuates float switch 10. On actuation of float switch 10, valve 7 is closed and simultaneously therewith or shortly thereafter, valve 8 is opened. The liquid then drains from tank 2 through outlet line 5. When the liquid reaches a predetermined lower level such that float 11 is allowed to move to a lower position, float switch 11 acts to close valve 8. In this manner, a known quantity of liquid is delivered to the terminal point. Simultaneously or shortly after the closure of valve 8, valve 7 is opened by the action of float switch 11 and a new filling cycle is started.

In accordance with the invention, there is provided an acoustic monitoring system comprising an acoustic pulse generator 20, an acoustic pulse receiver 21, a measuring device 23, and a recorder 25. The acoustic monitoring system is powered by a generator 26. The power from generator 26 to the monitoring system is supplied through a switch 29 which is operatively connected to conventional level sensing control means such as a float switch 31. The system functions such that each time the transmitter generates an acoustic pulse, it sends a signal to the measuring device 23. Upon receipt at the receiver 21 of the acoustic pulse, the receiver generates a signal which is received at measuring device 23. Device 23 responds to these signals to produce a control function which is indicative of the time interval between signals and therefore of the travel time of the acoustic pulse from transmitter 20 to receiver 21. Since, as hereinafter explained, the acoustic pulse travels through a column of oil of known height, the travel time of the pulse is representative of the water content of the oil.

In the disclosed embodiment of the invention, the control function output from device 23 is merely registered on recorder 25 to show the water content of the oil. It will be recognized, however, that the control function may be used to control the operation of the dump tank. For example, outlet line 5 can be provided with an automatic diverter valve, which responds to a control function indicative of a high water content to divert the contents of the tank to a treating system.

Acoustic systems of the type described are well known in the art and the system employed in the instant invention may take any suitable form. By way of example, an acoustic velocity measuring apparatus of the type shown in U.S. Patent No. 2,704,364 to Gerald C. Summers may be used. In this case, the system would operate as follows. Each time an acoustic pulse is generated at the transmitter 20, a voltage pulse is produced which is transmitted by way of conductors 27 and 28 to the measuring system 23. When the acoustic pulse reaches receiver 21, a voltage pulse is produced at the receiver and is transmitted to the measuring system 23 by way of a conductor 30. The measuring system 23 responds to the voltage pulses from transmitter 20 and receiver 21 to produce an output voltage which is directly proportional to the travel time of the acoustic pulse from transmitter 20 to receiver 21. The output voltage from system 23 is measured and graphically recorded on the recorder 25. For a complete description of the acoustic measuring system and its mode of operation, reference is made to the aforementioned patent to Summers.

As noted above, the accompanying drawing shows dump tank 2 in a filling cycle. When the fluid level reaches a predetermined upper level, it moves float switch 31 to the upper or active position. Switch 31 then functions to close switch 29. Upon closure of switch 29, power is applied to transmitter 20 which then generates an acoustic signal comprising at least one pulse and preferably a series of pulses. Transmitter 20 is positioned at a level in the tank such that it is in contact with the oil adjacent the surface thereof when float switch 31 is tripped and the acoustic pulse generated. The travel time for the acoustic pulse is measured by system 23 and recorded on recorder 25. Since the acoustic pulse travels a known distance between transmitter 20 and receiver 21 through a column of oil of known height, the output from system 23 is representative of the amount of water in the oil. Shortly after the acoustic transmitter 20 is triggered, the continued influx of fluid into the tank will cause float switch 10 to be moved to the active position. The tank will then be drained in the manner explained beforehand and the above sequence of operations repeated.

Although in the disclosed embodiment receiver 21 is positioned adjacent the bottom of the tank, it will be recognized that the positions of the transmitter and receiver may be reversed. In any case, they are at different elevations in the tank so that the acoustic pulse from transmitter to the receiver traverses a substantial vertical section of oil. Thus, an accurate indication of the total water content is obtained even though the water may not be distributed uniformly throughout the oil. In view of the tendency of the water to settle in the oil column, the invention presents a marked improvement over systems which measure the water content of the oil at a substantially single level.

It is preferred that the transmitter and receiver be positioned such that the acoustic pulse or pulses traverse subsantially the entire vertical section of oil delivered from tank 2. That is, the transmitter and receiver should be positioned as near as is practical to the top and bottom of the volume of oil delivered from the tank during each dumping cycle. In this regard, however, it should be noted that dump tanks or meters normally include a "dead-oil" space such as that indicated by the reference numeral 32 in which water, sediments, or other debris present in the oil may accumulate. The tank is flushed and drained periodically through a drain 34 in order to remove the accumulated sediments. Since the material in the dead-oil space is not delivered and monitoring thereof may result in an erroneous indication of water content, care should be taken to avoid spacing the receiver or transmitter, as the case may be, at a position such that the measured pulse travels through the dead-oil space. Therefore, in the preferred embodiment of the invention shown, the receiver 21 is placed at the level of, or slightly above, the mouth of outlet line 5.

The acoustic monitoring system of the present invention requires only a short time in which to make accurate measurements. For example, if the spacing between transmitter 20 and receiver 21 is two and one-half feet and assuming an acoustic velocity of 4500 feet per second for the oil to be monitored, the travel time for a pulse from the transmitter to the receiver would be 550 microseconds. From this it can be seen that a relatively large number of measurements can be made of each volume of oil delivered by tank 2. For example, the transmitter may generate an acoustic signal at a frequency of 500 cycles per second for a period of one second to obtain 500 measurements.

In view of the short time required for measurements, float 31 need only be placed a slight distance below float 10. In fact, under some circumstances it will be possible to dispense with float 31 and utilize a single upper float switch both to operate valves 7 and 8 and to operate switch 29. In this case, the delay inherent in the mechanical response of valves 7 and 8 to the actuation of the upper float switch would be relied upon to provide a time period during which the acoustic measurements are taken. Alternatively, the control system extending from the upper float switch to valves 7 and 8 and switch 29 may include a suitable timing mechansm which provides a predetermined time period during which the measurements are taken. That is, upon actuation of the upper float switch, valve 7 would be closed and after a specified time delay, valve 8 would be opened. During this time delay, switch 29 would be closed and the acoustic signal generated. This would insure that any mechanical wave action caused by the operation of valves 7 and 8 would not interfere with the measurements. While these and other modifications are possible, the embodiment shown utilizing a separate float switch for the activation of the acoustic monitoring system is preferred since this provides a reliable and yet simple and inexpensive system for insuring that the action of valves 7 and 8 does not interfere with the acoustic measurements.

From the foregoing description, it will be recognized that the particular oil under investigation must be calibrated in order to obtain a correlation between the travel time of the acoustic pulse from the transmitter to the receiver and the water content of the oil. This may be easily accomplished by running batches of oil of successively increasing or decreasing water content through the dump tank and measuring the travel time of an acoustic pulse for each batch of known water content.

Having described specific embodiments of the present invention, it is understood that further modifications thereof may be suggested to those skilled in the art, and it is intended to cover all such modifications as fall within the scope of the appended claims.

I claim:

1. In a method of characterizing a liquid flowing through a conduit, the steps of flowing said liquid from said conduit into an enlarged chamber and vertically accumulating said liquid within said chamber, generating an acoustic signal within said accumulation of liquid and passing said signal between a first elevation in the accumulation of liquid in said chamber and a second elevation in said accumulation of liquid spaced vertically a known distance from said first elevation, detecting said signal at one of said elevations, measuring a characteristic of said detected indicative of a property of said liquid, and withdrawing said accumulated liquid from said chamber at an elevation no higher than the lowermost of said first and second elevations.

2. In a method of characterizing a liquid flowing through a conduit, the steps of flowing said liquid into an enlarged chamber and vertically accumulating liquid within said chamber, generating an acoustic signal at a first point in said accumulation of liquid adjacent one end thereof, detecting said signal at a second point in said accumulation of liquid adjacent the other end thereof and a known vertical distance from said first point, measuring a characteristic of said detected signal indicative of a property of said liquid, terminating the flow of liquid into said chamber and, subsequent to said termination of flow and the generation of said acoustic signal, withdrawing said accumulated liquid from said chamber at an elevation no higher than the lowermost of said first and second points.

3. In a method of measuring the amount of water in an oil flowing through a conduit, the steps of flowing said oil from said conduit into an enlarged chamber and vertically accumulating oil within said chamber, generating an acoustic pulse at a first point in said accumulation of oil adjacent one end thereof, detecting said pulse at a second point in said accumulation of oil adjacent the other end thereof and a known vertical distance from said first point, measuring the time required for said pulse to travel from said first point to said second point, and withdrawing said accumulated oil from said chamber into a continuation of said conduit.

4. In a system for characterizing a liquid flowing through a conduit, means forming an enlarged chamber in said conduit, one of a radiation wave transmitter and a radiation wave receiver positioned in said chamber at an upper level thereof, the other of said transmitter and receiver positioned in said chamber at a lower level thereof, means for regulating flow through said chamber whereby the liquid therein reaches said upper level, means for energizing said transmitter when said liquid has reached said upper level whereby a radiation wave signal is transmitted through said liquid to said receiver, and means operatively connected with said transmitter and said receiver for measuring a characteristic of said signal indicative of a property of said liquid.

5. In a system for characterizing a liquid flowing through a conduit, means forming an enlarged chamber in said conduit, means for regulating flow through said chamber whereby the liquid in said chamber reaches a predetermined upper lever therein, one of an acoustic transmitter and an acoustic receiver positioned in said chamber adjacent said upper level, the other of said transmitter and receiver positioned in said chamber at a lower level thereof, means responsive to the liquid in said chamber reaching said upper level for energizing said transmitter whereby an acoustic signal is transmitted to said receiver, and means operatively connected with said transmitter and said receiver for measuring a characteristic of said acoustic signal indicative of a property of said liquid.

6. The system of claim 5 wherein said last-named means comprises means for measuring the travel time from said transmitter to said receiver of at least one acoustic pulse comprising said signal.

7. In a system for measuring the amount of water in an oil, dump tank, means for alternately filling said tank with oil to a predetermined upper lever and thereafter draining said tank to a predetermined lower level whereby the quantity of liquid passing through said tank may be determined, one of an acoustic transmitter and an acoustic receiver positioned at an upper position in said tank, the other said transmitter and receiver positioned at a lower position in said tank, means responsive to the oil in said tank reaching a predetermined upper level for energizing said transmitter whereby at least one acoustic signal is transmitted to said receiver, and means operatively connected with said transmitter and receiver for measuring a characteristic of said acoustic signal indicative of a property of said liquid.

8. In a system for measuring the amount of water in an oil, a dump tank, means for alternately filling said tank with oil to a predetermined upper level and thereafter draining said tank to a predetermined lower level whereby the quantity of liquid passing through said tank may be determined, one of an acoustic transmitter and an acoustic receiver positioned at an upper position in said tank and the other of said transmitter and receiver positioned at a lower position in said tank, means responsive to the liquid in said tank reaching a predetermined upper level at least as high as said upper position for energizing said transmitter whereby at least one acoustic pulse is transmitted to said receiver, and means operatively connected with said transmitter and receiver for measuring the travel time of said pulse from said transmitter to said receiver.

9. The system of claim 8 wherein said first-named means includes an outlet in said tank at an elevation above the bottom thereof and wherein said other of said transmitter and receiver is at a position at least as high as the elevation of said outlet.

10. The system of claim 4 wherein said means for regulating flow includes an outlet in said chamber at an elevation above the bottom thereof, and wherein said other of said transmitter and receiver is at a position at least as high as the elevation of said outlet.

11. The system of claim 5 wherein said means for regulating flow includes an outlet in said chamber at an elevation above the bottom thereof, and wherein said other of said transmitter and receiver is at a position at least as high as the elevation of said outlet.

12. The system of claim 7 wherein said first-named means includes an outlet in said tank at an elevation above the bottom thereof, and wherein said other of said transmitter and receiver is at a position at least as high as the elevation of said outlet.

13. The method of claim 3 further comprising the steps of terminating the flow of oil into said chamber and, subsequent to said termination of flow and the generation of said acoustic signal, withdrawing said accumulated oil from said chamber at an elevation no higher than the lowermost of said first and second points.

References Cited

UNITED STATES PATENTS

| | | | |
|---|---|---|---|
| 2,817,967 | 12/1957 | Meyers | 73—224 |
| 2,869,357 | 1/1959 | Kritz | 73—53 X |
| 3,040,562 | 6/1962 | Fitzgerald et al. | 73—53 X |
| 3,222,928 | 12/1965 | Walker | 73—224 |

FOREIGN PATENTS 934,118  1/1948  France.

DAVID SCHONBERG, *Primary Examiner.*

UNITED STATES PATENT OFFICE
CERTIFICATE OF CORRECTION

Patent No. 3,359,787                          December 26, 1967

Joseph Zemanek, Jr.

It is hereby certified that error appears in the above numbered patent requiring correction and that the said Letters Patent should read as corrected below.

Column 5, line 8, for "mechansm" read -- mechanism --; line 48, after "detected" insert -- signal --; column 6, line 38, after "oil," insert -- a --.

Signed and sealed this 21st day of January 1969.

(SEAL)
Attest:

Edward M. Fletcher, Jr.                          EDWARD J. BRENNER
Attesting Officer                                Commissioner of Patents